United States Patent
Majumdar et al.

(10) Patent No.: US 7,632,879 B2
(45) Date of Patent: Dec. 15, 2009

(54) AZINIUM SALTS AS SPLAYANT FOR LAYERED MATERIALS

(75) Inventors: Debasis Majumdar, Rochester, NY (US); Deepak Shukla, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 567 days.

(21) Appl. No.: 11/095,285

(22) Filed: Mar. 31, 2005

(65) Prior Publication Data

US 2006/0223919 A1 Oct. 5, 2006

(51) Int. Cl.
*C08K 5/3432* (2006.01)
*C08K 5/3462* (2006.01)
*C08K 5/3477* (2006.01)
*C09K 15/16* (2006.01)
*C07D 213/06* (2006.01)
*C07D 213/22* (2006.01)

(52) U.S. Cl. .................. 524/99; 524/100; 524/102; 252/401; 546/339

(58) Field of Classification Search ............... 546/339; 524/99, 100; 252/401
See application file for complete search history.

(56) References Cited

U.S. PATENT DOCUMENTS

| | | | |
|---|---|---|---|
| 2,256,877 A | * | 9/1941 | Bertsch ............ 252/8.57 |
| 3,410,858 A | * | 11/1968 | Stevens et al. .......... 546/339 |
| 4,739,007 A | | 4/1988 | Okada et al. |
| 4,810,734 A | | 3/1989 | Kawasumi et al. |
| 4,894,411 A | | 1/1990 | Okada et al. |
| 5,102,948 A | | 4/1992 | Deguchi et al. |
| 5,164,440 A | | 11/1992 | Deguchi et al. |
| 5,164,460 A | | 11/1992 | Yano et al. |
| 5,248,720 A | | 9/1993 | Deguchi et al. |
| 5,854,326 A | | 12/1998 | Sakaya et al. |
| 5,880,197 A | | 3/1999 | Beall et al. |
| 6,034,163 A | | 3/2000 | Barbee et al. |
| 6,767,951 B2 | | 7/2004 | Nair et al. |
| 6,767,952 B2 | | 7/2004 | Dontula et al. |
| 2003/0100656 A1 | | 5/2003 | Majumdar et al. |
| 2004/0042750 A1 | | 3/2004 | Gillberg et al. |

OTHER PUBLICATIONS

A. Okada et al., Polym Prep., 1987, vol. 28, pp. 447-448.
Rachel Levy and C.W. Francis, Journal of Colloid And Interface Science, *Interlayer Adsorption Of Polyvinylpyrrolidone On Montmorillonite*, Mar. 1975, vol. 50 (3), pp. 442-450.
D.J. Greenland, Journal of Colloid Science, *Adsorption Of Poly(vinyl alcohol) By Montmorilonite* vol. 18, 1963, pp. 647-664.
Richard A. Vaia et al., *New Polymer Electrolyte Nanocomposites: Melt intercalation of polyethyleneoxide in mica type silicates*, Advanced Materials, 7(2), 1995, pp. 154-156.
V. Mehrotra, E.P. Giannelis, Solid State Communications, 1991, vol. 77, No. 2, pp. 155-158.

* cited by examiner

*Primary Examiner*—Kriellion A Sanders
(74) *Attorney, Agent, or Firm*—J. Lanny Tucker

(57) ABSTRACT

The present invention relates to a splayant, that is, an intercalant/exfoliant, comprising an azinium compound capable of splaying a layered material.

5 Claims, No Drawings

AZINIUM SALTS AS SPLAYANT FOR LAYERED MATERIALS

CROSS REFERENCE TO RELATED APPLICATIONS

Reference is made to commonly assigned, U.S. patent application Ser. No. 11/096,093, now U.S. Pat. No. 7,365, 104, by Majumdar et al. filed of even date herewith entitled "Light Curable Articles Containing Azinium Salts", the disclosures of which is incorporated herein by reference.

FIELD OF THE INVENTION

The present invention relates to a layered material, splayed by an azinium compound.

BACKGROUND OF THE INVENTION

Over the last decade or so, the utility of inorganic nanoparticles as additives to enhance polymer performance has been well established. Ever since the seminal work conducted at Toyota Central Research Laboratories, polymer-layered material nanocomposites have generated interest across various industries. The unique physical properties of these nanocomposites have been explored by such varied industrial sectors as the automotive industry, the packaging industry, and plastics manufacturers. These properties include improved mechanical properties, such as elastic modulus and tensile strength, thermal properties such as coefficient of linear thermal expansion and heat distortion temperature, barrier properties, such as oxygen and water vapor transmission rate, flammability resistance, ablation performance, and solvent uptake. Some of the related prior art is illustrated in U.S. Pat. Nos. 4,739,007, 4,810,734, 4,894,411, 5,102,948, 5,164,440, 5,164,460, 5,248,720, 5,854,326, and 6,034,163.

Nanocomposites can be formed by mixing polymeric materials with intercalated layered materials, which have one or more foreign molecules or parts of foreign molecules inserted between platelets of the layered material. Although any amount can be used, the physical property enhancements for these nanocomposites are typically achieved with less than 20 vol. % addition, and usually less than 10 vol. % addition of the inorganic phase, which is typically layered materials or organically modified layered materials. Although these enhancements appear to be a general phenomenon related to the nanoscale dispersion of the inorganic phase, the degree of property enhancement is not universal for all polymers. It has been postulated that the property enhancement is very much dependent on the morphology and degree of dispersion of the inorganic phase in the polymeric matrix.

The layered materials in the polymer-layered material nanocomposites are ideally thought to have three structures: (1) layered material tactoids wherein the layered material particles are in face-to-face aggregation with no organics inserted within the layered material lattice, (2) intercalated layered materials wherein the layered material lattice has been expanded to a thermodynamically defined equilibrium spacing due to the insertion of individual polymer chains, yet maintaining a long range order in the lattice, and (3) exfoliated layered materials wherein singular layered material platelets are randomly suspended in the polymer, resulting from extensive penetration of the polymer into the layered material lattice and its subsequent delamination. The greatest property enhancements of the polymer-layered material nanocomposites are expected with the latter two structures mentioned herein above.

There has been considerable effort towards developing materials and methods for intercalation and/or exfoliation of layered materials and other layered inorganic materials. In addition to intercalation and/or exfoliation, the layered material phase should also be rendered compatible with the polymer matrix in which they are distributed. The challenge in achieving these objectives arises from the fact that unmodified layered material surfaces are hydrophilic, whereas a vast number of thermoplastic polymers of technological importance are hydrophobic in nature. Although intercalation of layered materials with organic molecules can be obtained by various means, compatibilizing these splayed layered materials in a polymer matrix for uniform distribution still poses considerable difficulty. In the industry, the layered material suppliers normally provide just the intercalated layered materials and the end users are challenged to select materials and processes for compatibilizing these layered materials in the thermoplastics of their choice. This selection process involves trial and error at a considerable development cost to the end users. Since layered material intercalation and compatibilization in the matrix polymer usually involve at least two distinct materials, processes, and sites, the overall cost of the product comprising the polymer-layered material nanocomposite suffers.

A vast majority of splayed layered materials are produced by interacting anionic layered materials with cationic surfactants including onium species such as ammonium (primary, secondary, tertiary, and quaternary), phosphonium, or sulfonium derivatives of aliphatic, aromatic or arylaliphatic amines, phosphines and sulfides. These onium ions can cause intercalation in the layered materials through ion exchange with the metal cations present in the layered material lattice for charge balance. However, these surfactant molecules may degrade during subsequent melt processing, placing severe limitation on the processing temperature and the choice of the matrix polymer. If the final product is to be coated out of a solvent-borne phase, compatibility of the intercalant with the proper solvent may also impose restrictions on the choice of the intercalant. Additionally, these surfactants can act as lubricants and negatively impact the potential enhancement of properties such as modulus and strength of the nanocomposite.

Intercalation of layered materials with a polymer, as opposed to a low molecular weight surfactant, is also known in the art. There are two major intercalation approaches that are generally used—intercalation of a suitable monomer followed by polymerization (known as in-situ polymerization, see A. Okada et. Al., *Polym Prep.*, Vol. 28, 447, 1987), or monomer/polymer intercalation from solution. Poly(vinyl alcohol) (PVA), polyvinyl pyrrolidone (PVP) and poly(ethylene oxide) (PEO) have been used to intercalate the layered material platelets with marginal success. As described by Levy et al., in "Interlayer adsorption of polyvinylpyrrolidone on montmorillonite", *Journal of Colloid and Interface Science*, Vol 50 (3), 442, 1975, attempts were made to sorb PVP between the monoionic montmorillonite layered material platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of poly(vinyl alcohol) by montmorrilonite", *Journal of Colloid Science*, Vol. 18, 647-664 (1963) discloses that sorption of PVA on the montmorrilonite was dependent on the concentration of PVA in the solution. It was found that sorption was effective only at polymer concentrations of the order of 1% by weight of the polymer. No further effort was made towards commercialization since it would be limited by the drying of the dilute splayed layered materials. In a recent work by Richard Vaia et al., "New Polymer Electrolyte Nanocomposites: Melt intercalation of polyethyleneoxide in mica type silicates", *Adv. Materials,* 7(2), 154-156, 1995, PEO was splayed into Na-montmorillonite and Li-montmorillonite by heating to 80° C. for 2-6 hours to achieve a d-spacing of 17.7° A. The extent of intercalation observed was identical to that obtained from solution (V. Mehrotra, E. P. Giannelis, *Solid State Commun.,* 77, 155, 1991). Other work (U.S. Pat. No. 5,804,613) has dealt with sorption of monomeric organic compounds having at least one carbonyl functionality selected from a group consisting of carboxylic acids and salts thereof, polycarboxylic acids and salts thereof, aldehydes, ketones and mixtures thereof. Similarly, U.S. Pat. No. 5,880,197 discusses the use of an intercalating monomer that contains an amine or amide functionality or mixtures thereof. In both these patents, and other patents issued to the same group, the intercalation is performed at very dilute layered material concentrations in a medium such as water, leading to a necessary and costly drying step, prior to melt processing.

Recently use of block copolymers has been disclosed in U.S. Pat. Nos. 6,767,951 and 6,767,952 and U.S. Patent Appl. No. 20030100656 A1 for intercalation of smectite clays. In these disclosures intercalation has been reported to have been achieved during melt processing with or without any other intercalating agents. These patents teach of specific block copolymers, which can further compatibilize the clays in various matrix polymers.

However, a survey of the art makes it clear that there is in general a dearth of guidelines for the selection of the intercalating agents for a wide variety of matrix polymer and layered material combinations. In addition, it is desirable to have multifunctional addenda, so that their relative amount in the nanocomposite is small and therefore has minimum deleterious effect, if any, on the properties of the nanocomposite. There is a critical need in the art to identify such addenda. There is also a critical need in the art for a comprehensive strategy for the development of better materials and processes to overcome some of the aforementioned drawbacks.

PROBLEM TO BE SOLVED

There remains a need for a multifunctional intercalant for layered materials and for the dispersion of the layered materials in a polymeric phase through an environmentally acceptable water or solvent-borne medium to form nanocomposites with desirable properties.

SUMMARY OF THE INVENTION

The present invention relates to a splayant, that is, an intercalant/exfoliant, comprising an azinium compound capable of splaying a layered material.

ADVANTAGEOUS EFFECT OF THE INVENTION

The present invention includes several advantages, not all of which are incorporated in a single embodiment. A splayed material, which can be effectively incorporated into a polymer-layered material nanocomposite, is described. In addition, such polymer-layered material nanocomposites can be incorporated into an article with improved physical properties such as modulus, tensile strength, toughness, impact resistance, electrical conductivity, heat distortion temperature, coefficient of linear thermal expansion, fire retardance, oxygen and water vapor barrier properties, scratch and abrasion resistance, to name a few. The application of such articles in a number of industrial sectors, such as automotive, packaging, battery, cosmetics, aerospace, have been elucidated in the literature (vide, for example, "Polymer-layered material Nanocomposites," Ed. T. J. Pinnavia and G. W. Beall, John Wiley & Sons, Ltd. Publishers).

The specific materials utilized, azinium compounds, may have multiple functionalities. Some functional groups of these azinium compounds are hydrophilic and have a natural affinity to the layered material surface, resulting in the ability to readily enter the layered material lattice and intercalate the layered materials. The azinium splayant compounds may further comprise a structural unit compatible with another host polymer, to which the splayed material is added. A multicomponent or multifunctional azinium compound can ensure effective splaying of the layered material as well as its compatibilization in the matrix. Thus, a number of necessary criteria of effectively dispersing layered materials in a polymer to form a desirable polymer-layered material nanocomposite, such as the ability to intercalate or exfoliate the layered material and compatibilization, can all be fulfilled by the right choice of azinium compound.

The splayed materials of this invention are also advantageous in processing versatility. The azinium compounds of the present invention are found to exhibit good solubility or dispersibility in aqueous media. This characteristic allows for an environmentally attractive coating process for the nanocomposite. The splayed materials can be incorporated into composite material either through solution processing or melt processing. This leads to broad application in paint, thermaoplastics, coatings, and other applications of polymers.

Another advantage of the invention derives from the fact that the layered material, the azinium compound and the matrix polymer can all be combined in a single step into a coating composition, which can be subsequently coated and cured.

Additionally, the present invention teaches a general strategy wherein the chemistry of the azinium compound can be tailored according to the choice of the layered material and the specific matrix polymer. The molecular weights can be controlled easily to meet the processing conditions, such as temperature, shear, viscosity and other various physical properties as desired in the end product.

These and other advantages will be apparent from the detailed description below.

DETAILED DESCRIPTION OF THE INVENTION

The present invention relates to an azinium compound used to splay, that is, intercalate, exfoliate or a combination of the two, a layered material.

When reference in this application is made to a particular group, unless otherwise specifically stated, the group may itself be unsubstituted or substituted with one or more substituents (up to the maximum possible number). For example, "alkyl" group refers to a substituted or unsubstituted alkyl group, such as arylalkyl group or sulfoalkyl group while "aryl" group refers to a substituted or unsubstituted aryl group (with up to six substituents) such as alkylaryl or sulfoaryl group. The substituent may be itself substituted or unsubstituted.

Generally, unless otherwise specifically stated, substituents include any substituents, whether substituted or unsubstituted, which do not destroy properties necessary for the intended utility. Examples of substituents include known substituents, such as: halogen, for example, chloro, fluoro, bromo, iodo; alkoxy, particularly those "lower alkyl" (that is, with 1 to 6 carbon atoms, for example, methoxy, ethoxy; substituted or unsubstituted alkyl, particularly lower alkyl (for example, methyl, trifluoromethyl); thioalkyl (for example, methylthio or ethylthio), particularly either of those with 1 to 6 carbon atoms; substituted and unsubstituted aryl, particularly those having from 6 to 20 carbon atoms (for example, phenyl); and substituted or unsubstituted heteroaryl, particularly those having a 5 or 6-membered ring containing 1 to 3 heteroatoms selected from N, O, or S (for example, pyridyl, thienyl, furyl, pyrrolyl); acid or acid salt groups such as any of those described below; and others known in the art. Alkyl substituents may specifically include "lower alkyl" (that is, having 1-6 carbon atoms), for example, methyl, and ethyl. Further, with regard to any alkyl group or alkylene group, it will be understood that these may be branched or unbranched and include ring structures.

Whenever used in the specification the terms set forth shall have the following meaning:

"Nanocomposite" shall mean a composite material wherein at least one component comprises an inorganic phase, such as a smectite layered material, with at least one dimension in the 0.1 to 100 nanometer range.

"Plates" shall mean particles with two comparable dimensions significantly greater than the third dimension, for example, length and width of the particle being of comparable size but orders of magnitude greater than the thickness of the particle.

"Layered material" shall mean an inorganic material such as a smectite layered material that is in the form of a plurality of adjacent bound layers.

"Platelets" shall mean individual layers of the layered material.

"Intercalation" shall mean the insertion of one or more foreign molecules or parts of foreign molecules between platelets of the layered material, usually detected by X-ray diffraction technique, as illustrated in U.S. Pat. No. 5,891,611 (line 10, col. 5-line 23, col. 7).

"Intercalant" shall mean the foreign molecule inserted between platelets of the layered material.

"Intercalated " shall refer to layered material that has at least partially undergone intercalation and/or exfoliation.

"Exfoliation" or "delamination" shall mean separation of individual platelets in to a disordered structure, without any stacking order.

"Organo layered material" shall mean layered material modified by organic molecules.

"Splayed" layered materials are defined as layered materials which are completely intercalated with no degree of exfoliation, totally exfoliated materials with no degree of intercalation, as well as layered materials which are both intercalated and exfoliated including disordered layered materials.

"Splaying" refers to the separation of the layers of the layered material, which may be to a degree, which still maintains a lattice-type arrangement, as in intercalation, or to a degree, which spreads the lattice structure to the point of loss of lattice structure, as in exfoliation.

"Splayant" refers to any material that can cause splaying of the layered material.

The splayant of the invention may contain one or more N-azinium compounds. For purposes of the present invention, the N-azinium compound is an N-heterocyclic compound having a heterocyclic nucleus, such as a pyridinium, quinolinium, thiazolium, imidazolium, or phenanthridinium nucleus.

In the scope of the invention, the azinium compound is an N-heterocyclic compound having a heterocyclic nucleus represented by general formula I

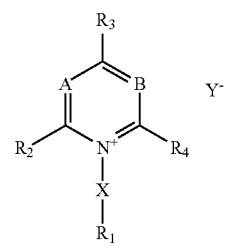

wherein A and B independently represent a carbon, C—$R_5$, C—$R_6$ or nitrogen; X is independently O, N, S, C=O, C=S, O—C=O or $R_7$—C—$R_8$; each $R_1$, $R_2$, $R_3$, $R_4$, $R_6$, $R_5$, $R_7$, and $R_8$ is independently hydrogen, alkyl or an aryl group; any A, B and R groups where chemically feasible may join to form a ring; and Y is a charge balancing anion, which may be a separate moiety or part of an A, B, or R.

In a useful embodiment, the azinium salts in the present invention are represented by formula II:

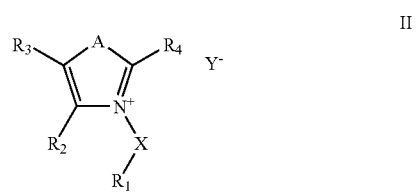

wherein A represents a carbon, C—$R_5$, nitrogen, sulfur or oxygen atom with sufficient bonds and substituents to form a heteroaromatic ring and each R independently represents a hydrogen or a substituent. Specifically X is independently O, N, S, C=O, C=S, O—C=O or $R_7$—C—$R_8$; each $R_1$, $R_2$, $R_3$, $R_4$, $R_7$, and $R_8$ is independently hydrogen, alkyl or an aryl group; any two or more R substituents may form a ring; and Y is a charge balancing anion, which may be a separate moiety or part of an R.

The X of the N-azinium compound which quaternizes the ring nitrogen atom of the azinium nucleus may be alkyl, phenyl, oxygen and nitrogen. The $R_1$ of the N-azinium compound may be selected from among a variety of synthetically convenient oxy groups. The group $R_1$ can, for example, be an alkyl group such as methyl, ethyl, butyl, benzyl, an aralkyl group (for example, benzyl or phenethyl) and a sulfoalkyl group (e.g. for example, sulfomethyl). The group $R_1$ can be an aryl group such as a phenyl group. In another form $R_1$ can be an acyl group, such as an —C(O)—$R_{11}$ group, where $R_{11}$ is an alkyl and aryl groups such as phenyl or naphthyl, tolyl, or xylyl, etc. When $R_1$ is an alkyl group, it typically contains from 1 to 18 carbon atoms, when $R_1$ is an aryl group, it typically contains from 6 to 18 carbon atoms.

According to a specific embodiment, $R_1$ is preferably an alkyl having from 1 to 18 carbon atoms or an aryl group having from 6 to 18 carbon atoms.

Useful N-azinium compounds can also be attached as functional groups in polymerized chains, represented by the following formula

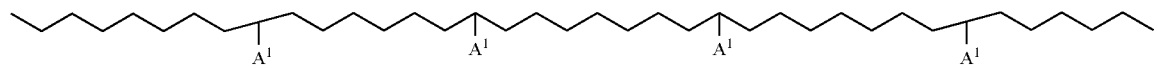

wherein $A^+$ is the N-azinium moiety. The linking alkyl chain may have additional substituents, for example, ether, ester, or amide.

In another useful embodiment, the azinium salts in the present invention are represented by formulas III and IV:

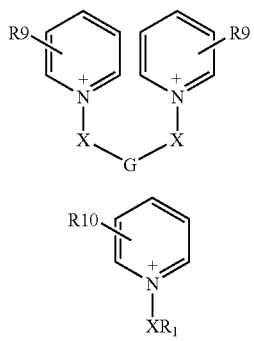

wherein $R_1$ is an alkyl, or an aryl, $R_{10}$ or $R_9$ are independently a hydrogen atom, alkyl, aryl, heterocyclic, carboxylic, carboxylate, carbonamido, sulfonamido, nitryl, groups, —CO—$R_{11}$ wherein $R_{11}$ is an alkyl group or aryl group, or —(CH=CH)$_m$—$R_{12}$ group wherein $R_{12}$ is an aryl or heterocyclic group and m is 1-2; G is an alkylene group, preferably —(CH$_2$)$_n$— wherein n is from 1 to 12.; X is independently O, N, S, C=O, C=S, O—C=O or $R_7$—C—$R_8$ and $R_7$, and $R_8$ is independently hydrogen, alkyl or an aryl group.

The $R_1$ group in aforementioned structures I, II and IV represents alkyl group of 1-12 carbons, or alkyl group substituted with one or more groups selected from the group consisting of acyloxy, alkoxy, aryloxy, alkylthio, arylthio, alkylsulfonyl, thiocyano, cyano, halogen, alkoxycarbonyl, aryloxycarbonyl, acetyl, aroyl, alkylaminocarbonyl, arylaminicarbonyl, alkylaminocarbonyloxy, arylaminocarbonyloxy, acylamino, carboxy, sulfo, trihalomethyl, alkyl, aryl, heteroaryl, alkylureido, arylureido, succinimido, and phthalimido substituent; aryl group, or acyl group; each $R_2$, $R_3$ $R_4$, $R_5$, $R_6$, $R_7$, $R_8$, $R_9$, and $R_{10}$ represents independently hydrogen, an alkyl group of 1-12 carbons, an aryl or heteroaryl group, unsubstituted or substituted with one or more substituents selected from the group consisting of an acyloxy, alkoxy, aryloxy, alkylthio, arylthio, alkylsulfonyl, thiocyano, cyano, halogen, alkoxycarbonyl, aryloxycarbonyl, acetyl, aroyl, alkylaminocarbonyl, arylaminicarbonyl, alkylaminocarbonyloxy, arylaminocarbonyloxy, acylamino, carboxy, sulfo, trihalomethyl, alkyl, aryl, heteroaryl, alkylureido, arylureido, succinimido and phthalimido substituent, or an acyloxy, hydroxy, alkoxy, aryloxy, alkylthio, arylthio, alkylsulfonyl, thiocyano, cyano, halogen, alkoxycarbonyl, aryloxycarbonyl, acetyl, aroyl, alkylaminocarbonyl, arylaminicarbonyl, alkylaminocarbonyloxy, arylaminocarbonyloxy, acylamino, amino, alkylamino, arylamino, carboxy, sulfo, trihalomethyl, alkyl, aryl, heteroaryl, alkylureido, arylureido, succinimido, phthalimido group, —CO—$R_{11}$ wherein $R_{11}$ is an alkyl or an aryl group, or —(CH=CH)$_m$—$R_{12}$ wherein $R_{12}$ is an aryl or heterocyclic group ; m is 1 or 2;

Illustrative examples of useful substituents in structures III and IV are shown in Table 1 below:

TABLE 1

| | $R_{10}$ or $R_9$ | $R_1$ or G |
|---|---|---|
| A-1 | $R_{10}$ = 4-Ph | $R_1$ = Me |
| A-2 | $R_{10}$ = 4-Ph | $R_1$ = (CH$_2$)$_3$—Ph |
| A-3 | $R_{10}$ = 4-Ph | $R_1$ = (CH$_2$)$_3$—SO$_3^-$ |
| A-4 | $R_{10}$ = 4-Ph | $R_1$ = (ethylnaphthyl) |
| A-5 | $R_{10}$ = 4-Ph | $R_1$ = (propyl phthalimido) |
| A-6 | $R_{10}$ = 4-CN | $R_1$ = Me |
| A-7 | $R_{10}$ = 3-CO$_2$Me | $R_1$ = Me |
| A-8 | $R_{10}$ = 3-CO$_2$—(CH$_2$)$_2$—Ph | $R_1$ = Me |
| A-9 | $R_9$ = 4-Ph | G = (CH$_2$)$_3$ |
| A-10 | $R_9$ = 4-Ph | G = (CH$_2$)$_4$ |
| A-11 | $R_9$ = 4-Ph | G = (CH$_2$)$_5$ |
| A-12 | $R_{10}$ = 3-Ph | $R_1$ = Me |
| A-13 | $R_{10}$ = 3,4-benzo | $R_1$ = Me |
| A-14 | $R_9$ = 3,4-benzo | G = (CH$_2$)$_3$ |
| A-15 | $R_{10}$ = H | $R_1$ = (CH$_2$)$_3$—SO$_3^-$ |
| A-16 | $R_{10}$ = H | $R_1$ = 4-nitrophenyl |
| A-17 | $R_9$ = H | G = (CH$_2$)$_2$ |
| A-18 | $R_9$ = H | G = (CH$_2$)$_3$ |
| A-19 | $R_{10}$ = 2-Me | $R_1$ = Me |
| A-20 | $R_{10}$ = 2-Me | $R_1$ = (CH$_2$)$_3$—SO$_3^-$ |
| A-21 | $R_{10}$ = 4-Me | $R_1$ = Me |
| A-22 | $R_9$ = 4-Me | G = (CH$_2$)$_4$ |
| A-23 | $R_{10}$ = 4-CO$_2^-$ | $R_1$ = Me |
| A-24 | $R_{10}$ = 4-CON(CH$_2$CH$_2$OH)$_2$ | $R_1$ = (CH$_2$)$_3$—SO$_3^-$ |

Most preferably, the previous Table 1 will be utilized with azinium compounds of Formulas V and VI:

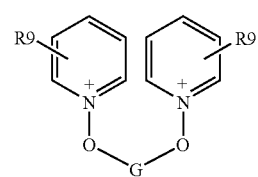

-continued

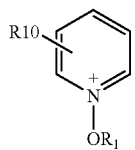

VI wherein $R_1$ is an alkyl, an aryl or an acyl, $R_{10}$ or $R_9$ are independently a hydrogen atom, alkyl, aryl, heterocyclic, carboxylic, carboxylate, carbonamido, sulfonamido, nitryl, groups, —CO—$R_{11}$ wherein $R_{11}$ is an alkyl group or aryl group, or —(CH=CH)$_m$—$R_{12}$ group wherein $R_{12}$ is an aryl or heterocyclic group; G is an alkylene group, preferably —(CH$_2$)$_n$— wherein n is from 1 to 12; X is independently O, N, S, C=O, C=S, O—C=O or $R_7$—C—$R_8$ and $R_7$, and $R_8$ is independently hydrogen, alkyl or an aryl group.

Illustrative examples of useful N-azinium compounds are shown by the formulae below in Table 2:

TABLE 2

I-1
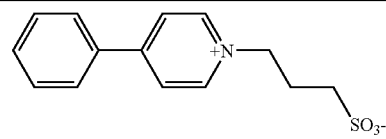

I-2
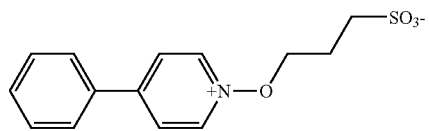

I-3
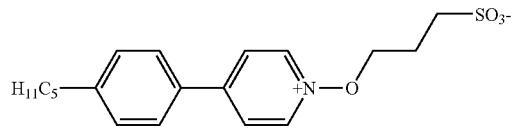

I-4
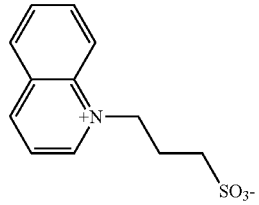

I-5
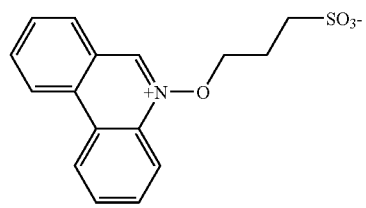

I-6
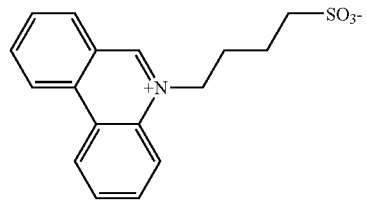

I-7
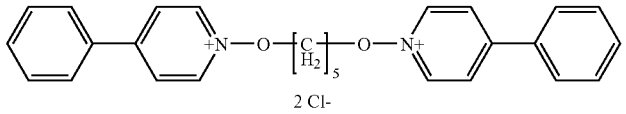

2 Cl-

I-8
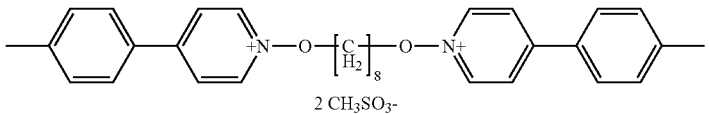

2 CH$_3$SO$_3$-

TABLE 2-continued
I-9 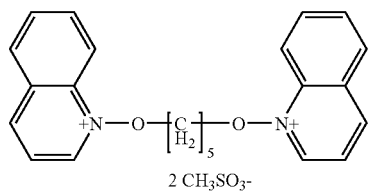
2 CH$_3$SO$_3$-
I-10 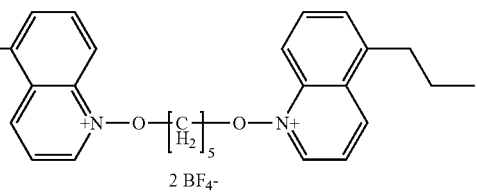
2 BF$_4$-
I-11 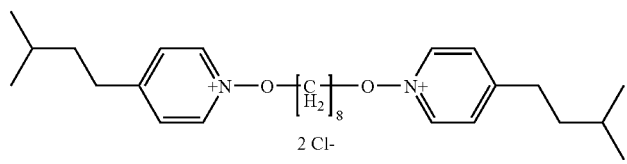
2 Cl-
I-12 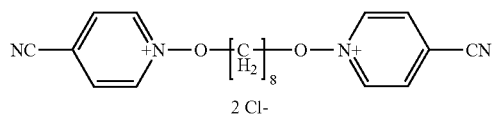
2 Cl-
I-13 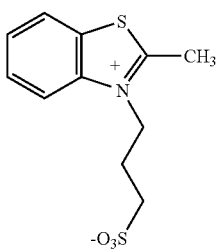
I-14 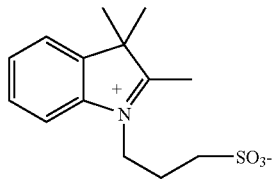
I-15 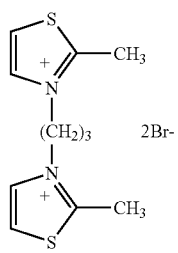
2Br-
I-16 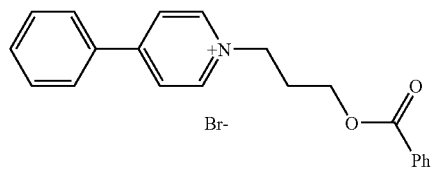

TABLE 2-continued
I-17 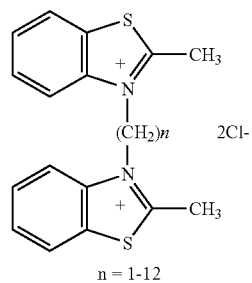
n = 1-12
I-18 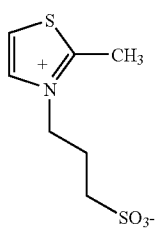
I-19 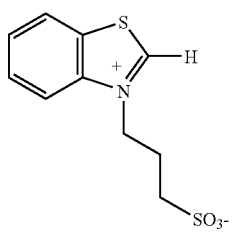
I-20 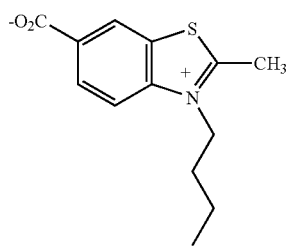
I-21 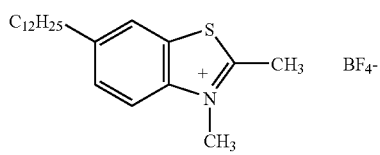
I-22 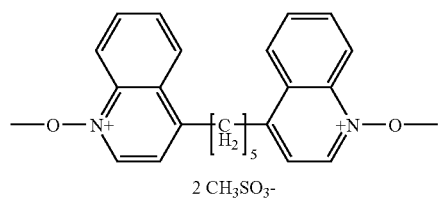
2 CH$_3$SO$_3$-
I-23 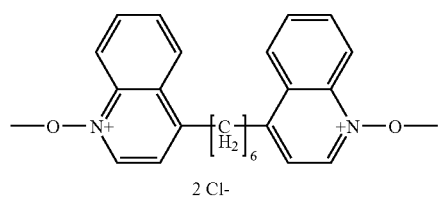
2 Cl- TABLE 2-continued
I-24
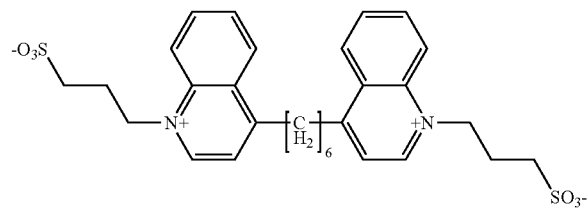
I-25
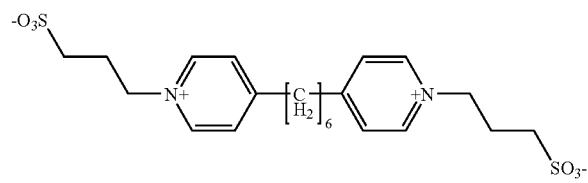
I-26
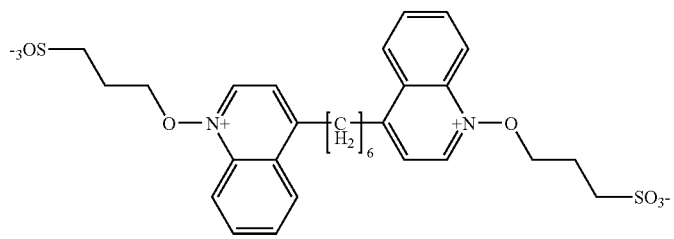
I-27
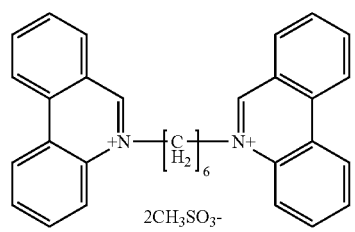
2CH$_3$SO$_3$-
I-28
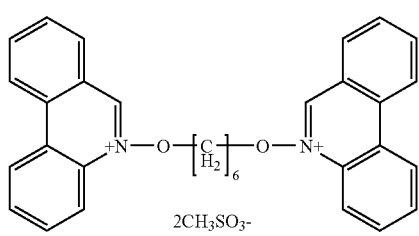
2CH$_3$SO$_3$-
I-29
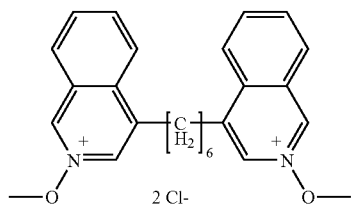
2 Cl-
I-30
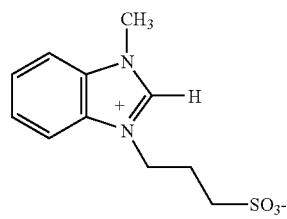

TABLE 2-continued

I-31
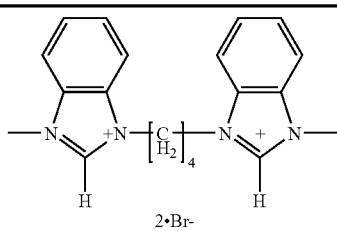

I-32
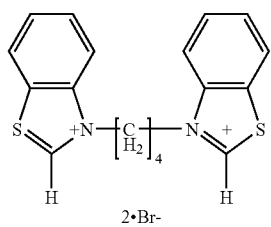

I-33
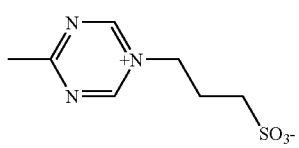

I-34
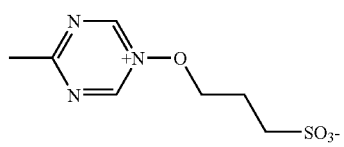

I-35
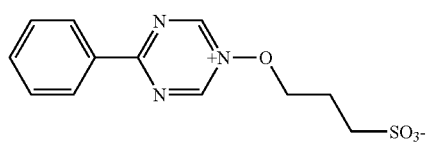

I-36
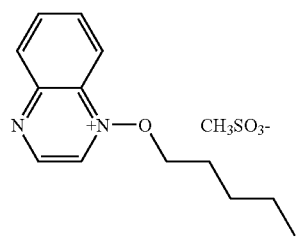

I-37
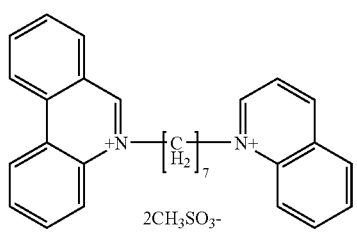

The N-azinium compounds are associated with a counter ion that is not involved in the activity of the present splayant and may be any of the conventional anions, for example, halide, fluoroborate, hexafluorophosphate, or toluene sulfonate. The counter ion may also be an oligomeric or polymeric species. Any convenient charge balancing counter ion may be employed to complete the N-azinium compounds. Preferably, the counter ion is part of the A, B, or R groups. Most preferably, the counter ion will be part of $R_1$. The positioning of the counter ion in the R group is beneficial because it adds to the stability of the dispersion of the layered material, as the presence of excess salt may cause precipitation of the layered material due to undesirable ionic interaction. The ease of processability is also enhanced as the solubility of the azinium compound may be negatively affected by the presence of free counter ions.

The layered materials most suitable for this invention include materials in the shape of plates with significantly high aspect ratio. However, other shapes with high aspect ratio will also be advantageous. The layered materials suitable for this invention comprise clays or non-clays. These materials include phyllosilicates, for example, montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof.

Other useful layered materials include illite, mixed layered illite/smectite minerals, such as ledikite and admixtures of illites with the layered materials named above. Other useful layered materials, particularly useful with anionic matrix polymers, are the layered double hydroxide clays or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be splayed with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\text{-}2H_2O$, $CaPO_4CH_3\text{—}H_2O$, $MnHAsO_4\text{—}H_2O$, and $Ag_6Mo_{10}O_{33}$.

Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in the literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred.

Preferred layered materials for the present invention include clays, especially smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred layered materials include montmorillonite, hectorite and hydrotalcites, because of commercial availability of these materials.

The layered materials may be natural or synthetic, for example, synthetic smectite layered materials. This distinction can influence the particle size and/or the level of associated impurities. Typically, synthetic layered materials are smaller in lateral dimension, and therefore possess smaller aspect ratio. However, synthetic layered materials are purer and are of narrower size distribution, compared to natural clays and may not require any further purification or separation. For this invention, the clay particles should have a lateral dimension of between 0.01 μm and 5 μm, and preferably between 0.05 μm and 2 μm, and more preferably between 0.1 μm and 1 μm. The thickness or the vertical dimension of the clay particles may vary between 0.5 nm and 10 nm, and preferably between 1 nm and 5 nm. The aspect ratio, which is the ratio of the largest and smallest dimension of the layered material particles should be >10:1 and preferably >100:1 and more preferably >1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles may cause optical defects, such as haze, and may be abrasive to processing, conveyance and finishing equipment as well as the imaging layers.

The clay used in this invention may be an organoclay. Organoclays may be produced by interacting the unfunctionalized clay with suitable intercalants. These other intercalants may be typically organic compounds, which may be neutral or ionic. Useful neutral organic molecules include polar molecules such as amides, esters, lactams, nitrites, ureas, carbonates, phosphates, phosphonates, sulfates, sulfonates, and nitro compounds.

These other neutral organic intercalants may be monomeric, oligomeric or polymeric. Neutral organic molecules can cause intercalation in the layers of the layered materials through hydrogen bonding, without completely replacing the original charge balancing ions. Useful ionic compounds may be cationic surfactants including onium species such as ammonium (primary, secondary, tertiary, and quaternary), phosphonium, or sulfonium derivatives of aliphatic, aromatic or arylaliphatic amines, phosphines and sulfides. Typically onium ions can cause intercalation in the layers through ion exchange with the metal cations of the preferred smectite clay. A number of commercial organoclays are available from clay vendors, which may be used in the practice of this invention.

The weight ratio of the layered materials to azinium compound can vary from 0.1:99.9 to 99.9:0.1. However it is preferred to be between 90:10 to 50:50 and more preferred to be between 80:20 and 60:40 in order to optimize the desirable physical properties of layered materials and the splayant.

The splayed layered material may be further dispersed in a matrix polymer. Such matrix polymer of the invention may be any natural or synthetic polymer. The matrix polymer may also be any water soluble or insoluble polymer. The water soluble polymers preferred include gelatin, poly(vinyl alcohol), poly(ethylene oxide), polyvinylpyrolidinone, poly (acrylic acid), poly(styrene sulfonic acid), polyacrylamide, and quaternized polymers. Other suitable matrix polymers may include aqueous emulsions of addition-type homopolymers and copolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides, and olefins and aqueous dispersions of polyurethanes and polyesterionomers.

Other water insoluble matrix polymers include polyester, polyethersulfone, polycarbonate, polysulfone, a phenolic resin, an epoxy resin, polyimide, polyetherester, polyetheramide, cellulose nitrate, cellulose acetate such as cellulose diacetate or cellulose triacetate, poly(vinyl acetate), polystyrene, polyolefins including polyolefin ionomers, polyamide, aliphatic polyurethanes, polyacrylonitrile, polytetrafluoroethylenes, polyvinylidene chlorides and fluorides, poly(methyl (x-methacrylates), an aliphatic or cyclic polyolefin, polyarylate, polyetherimide, polyethersulphone, polyimide, Teflon poly(perfluoro-alboxy) fluoropolymer, poly(ether ether ketone), poly(ether ketone), poly(ethylene tetrafluoroethylene)fluoropolymer, poly(methyl methacrylate), various acrylate or methacrylate copolymers, natural or synthetic paper, resin-coated or laminated paper, voided polymers including polymeric foam, microvoided polymers, microporous materials, fabric, or any blend or interpolymer thereof.

The matrix polymer may also contain optional addenda, which may include, but are not limited to, nucleating agents, fillers, plasticizers, impact modifiers, chain extenders, colorants, lubricants, antistatic agents, pigments such as titanium oxide, zinc oxide, talc, calcium carbonate, dispersants such as fatty amides, (for example, stearamide), metallic salts of fatty acids, for example, zinc stearate, magnesium stearate, dyes such as ultramarine blue, cobalt violet, antioxidants, fluorescent whiteners, ultraviolet absorbers, fire retardants, roughening agents, cross linking agents, surfactants, lubricants and voiding agents. These optional addenda and their corresponding amounts can be chosen according to need.

When incorporated in a polymer matrix, the weight ratio of the splayed material to polymer matrix can vary from 0.1:99.9 to 99.9:0.1. However it is preferred to be between 1:99 to 50:50, and more preferred to be between 2:98 and 20:80, and most preferred to be between 3:97 and 15:85 in order to optimize the desirable physical properties of the nanocomposite.

For the practice of the present invention, it is important to ensure compatibility between the matrix polymer and at least part of the azinium splayant used for layered material intercalation or exfoliation. If the matrix polymer comprises a blend of polymers, the polymers in the blend should be compatible with at least part of the azinium splayant polymer used for layered material splaying. If the matrix polymer comprises copolymer(s), the copolymer(s) should be compatible with at least part of the azinium splayant used for layered material splaying.

The material of the invention comprising layered material splayed with an azinium compound can form any article, alone or dispersed in a matrix polymer. This article of the invention can be of any size and form, a liquid such as a solution, dispersion, and latex, or a solid such as a sheet, rod, particulate, powder, fiber, wire, tube, woven, nonwoven, support, and a layer in a multilayer structure. The article of the invention can be used for any purpose, such as packaging, woven or nonwoven products, protective sheets or clothing, imaging media and medical implements.

In one preferred embodiment of the invention, the article of the invention comprises the base of an imaging element. Such imaging elements include those utilizing photographic, electrophotographic, electrostatographic, photothermographic, migration, electrothermographic, dielectric recording, thermal dye transfer, inkjet and other types of imaging. In a more preferred embodiment of the invention, the article of the invention comprises the base of a photographic imaging element, particularly a photographic reflective print material, such as paper or other display product.

Typical bases for imaging elements comprise cellulose nitrate, cellulose acetate, poly(vinyl acetate), polystyrene, polyolefins, poly(ethylene terephthalate), poly(ethylene naphthalate), polycarbonate, polyamide, polyimide, glass, natural and synthetic paper, resin coated paper, voided polymers, microvoided polymers, microporous materials, nanovoided polymers and nanoporous materials, and fabric.

The material of the invention can be incorporated in any of these materials and/or their combination for use in the base of the appropriate imaging element. In case of a multilayered imaging element, the aforementioned material of the invention can be incorporated in any one or more layers, and can be placed anywhere in the imaging support, for example, on the topside, or the bottom side, or both sides, and/or in between the two sides of the support. The method of incorporation can include extrusion, coextrusion with or without stretching, blow molding, casting, co-casting, lamination, calendering, embossing, coating, spraying, and molding. The image receiving layer or layers, as per the invention, can be placed on either side or both sides of the imaging support.

In a preferred embodiment, the material of this invention may be incorporated in imaging supports used for image display such as reflective print media including papers, particularly resin coated papers, voided polymers, and combinations thereof. Alternatively, the imaging support may comprise a combination of a reflective medium and a transparent medium, in order to realize special effects, such as day and night display. In a preferred embodiment, at least one layer comprising the material of the present invention is incorporated in a paper support, because of its widespread use. In another preferred embodiment, at least one layer comprising the material of the present invention is incorporated into an imaging support comprising a voided polymer, because of its many desirable properties such as tear resistance, smoothness, improved reflectivity, metallic sheen, and day and night display usage.

The aforementioned imaging supports can comprise any number of auxiliary layers. Such auxiliary layers may include antistatic layers, back mark retention layers, tie layers or adhesion promoting layers, hardcoats or scratch or abrasion resistant layers, conveyance layers, barrier layers, splice providing layers, UV absorption layers, antihalation layers, optical effect providing layers, and waterproofing layers.

The support for the ink recording element wherein the material of the invention can be used can be any of those usually used for inkjet receivers. The support can be either transparent or opaque. Opaque supports include plain paper, coated paper, resin coated paper such as polyolefin coated paper, synthetic paper, photographic paper support, melt extrusion-coated paper, and polyolefin laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. The support can also consist of microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Transparent supports include glass, cellulose derivatives, such as a cellulose ester, cellulose triacetate, cellulose diacetate, cellulose acetate propionate, cellulose acetate butyrate, polyesters, such as poly(ethylene terephthalate), poly(ethylene naphthalate), poly-1,4-cyclohexanedimethylene terephthalate, poly(butylene terephthalate), and copolymers thereof, polyimides, polyamides, polycarbonates, polystyrene, polyolefins, such as polyethylene or polypropylene, polysulfones, polyacrylates, polyether imides, and mixtures thereof. The papers listed above include a broad range of papers, from high end papers, such as photographic paper to low end papers, such as newsprint. In a preferred embodiment, Ektacolor paper made by Eastman Kodak Co. is employed. The term as used herein, "transparent" means the ability to pass radiation without significant deviation or absorption.

The support may have a thickness of from about 50 to about 500 μm, preferably from about 75 to 300 μm. Antioxidants, brightening agents, antistatic agents, plasticizers and other known additives may be incorporated into the support, if desired.

In order to improve the adhesion of the ink receiving layer to the support, an undercoating or subbing layer may be applied to the surface of the support. This layer may be an adhesive layer such as, for example, halogenated phenols, partially hydrolyzed vinyl chloride-co-vinyl acetate polymer, vinylidene chloride-methyl acrylate-itaconic acid terpolymer, a vinylidene chloride-acrylonitrile-acrylic acid terpolymer, or a glycidyl (meth)acrylate polymer or copolymer. Other chemical adhesives, such as polymers, copolymers, reactive polymers or copolymers, that exhibit good bonding between the ink receiving layer and the support can be used. The polymeric binder in the subbing layer is preferably a water soluble or water dispersible polymer such as poly(vinyl alcohol), poly(vinyl pyrrolidone), gelatin, a cellulose ether, a poly(oxazoline), a poly(vinylacetamide), partially hydrolyzed poly(vinyl acetate/vinyl alcohol), poly(acrylic acid), poly(acrylamide), poly(alkylene oxide), a sulfonated or phosphated polyester or polystyrene, casein, zein, albumin, chitin, chitosan, dextran, pectin, a collagen derivative, collodian, agar-agar, arrowroot, guar, carrageenan, tragacanth, xanthan, and rhamsan, a latex such as poly(styrene-co-butadiene), a polyurethane latex, a polyester latex, or a poly(acrylate), poly (methacrylate), poly(acrylamide) or copolymers thereof.

In a preferred embodiment, the subbing layer polymeric binder is a sulfonated polyester dispersion, such as AQ29 ® (Eastman Chemical Co.), gelatin, a polyurethane or poly (vinyl pyrrolidone). The polymeric binder for the subbing layer is preferably used in an amount of from about 1 to about 50 g/m$^2$, preferably from about 1 to about 20 g/m$^2$.

A borate or borate derivative employed in the subbing layer of the ink jet recording element of the invention may be, for example, borax, sodium tetraborate, boric acid, phenyl boronic acid, or butyl boronic acid. As noted above, the borate or borate derivative is used in an amount of from about 3 to about 50 g/m$^2$, preferably from about 3 to about 10 g/m$^2$. It is believed that upon coating, the borate or borate derivative in the subbing layer diffuses into the image receiving layer to crosslink the crosslinkable binder in the image receiving layer.

Other methods to improve the adhesion of the layer to the support include surface treatment of the support by corona discharge, plasma treatment in a variety of atmospheres, UV treatment, which is performed prior to applying the layer to the support.

The support can contain one or more conducting layers such as an antistatic layer to prevent undesirable static discharges during manufacture and printing of the image. This may be added to either side of the element. Antistatic layers conventionally used for color films have been found to be satisfactory, such as those in U.S. Pat. No. 5,147,768, the disclosure of which is hereby incorporated by reference. Preferred antistatic agents include metal oxides, for example, tin oxide, antimony doped tin oxide and vanadium pentoxide. These antistatic agents are preferably dispersed in a film forming binder.

Used herein, the phrase "ink recording element", which may also be referred to as an "imaging element" comprises an imaging support as described above along with an image receiving or recording layer as applicable to multiple techniques governing the transfer of an image onto the imaging element. Such techniques include thermal dye transfer with thermosensitive imaging materials, electrophotographic printing, or inkjet printing, as well as a support for photographic silver halide images. As used herein, the phrase "photographic element" is a material that utilizes photosensitive silver halide in the formation of images. The material of the present invention may be used in a single or a hybrid system combining one or more technique. An example of a hybrid system might be an inkjet printing application on a photographic element.

Inks used to image the recording elements are well known in the art. The ink compositions used in inkjet printing typically are liquid compositions comprising a solvent or carrier liquid, dyes or pigments, humectants, organic solvents, detergents, thickeners, and preservatives. The solvent or carrier liquid can be solely water or can be water mixed with other water miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water soluble direct or acid type dyes. Such liquid compositions have been described extensively in the prior art including, for example, U.S. Pat. Nos. 4,381,946; 4,239,543; and 4,781,758, the disclosures of which are hereby incorporated by reference.

When used as inkjet imaging media, the recording elements or media typically comprise a substrate or a support material having on at least one surface thereof an ink receiving or recording/recording or image forming layer. If desired, in order to improve the adhesion of the inkjet receiving or recording layer to the support, the surface of the support may be corona discharge treated prior to applying the solvent absorbing layer to the support or, alternatively, an undercoating, such as a layer formed from a halogenated phenol or a partially hydrolyzed vinyl chloride-vinyl acetate copolymer, can be applied to the surface of the support. The inkjet receiving or recording layer is preferably coated onto the support layer from water or water-alcohol solutions at a dry thickness ranging from 3 to 75 micrometers, preferably 8 to 50 micrometers.

Any known inkjet receiver layer can be used in combination with other materials. For example, the ink receiving or recording layer may consist primarily of inorganic oxide particles such as silicas, modified silicas, clays, aluminas, fusible beads such as beads comprised of thermoplastic or thermosetting polymers, nonfusible organic beads, or hydrophilic polymers such as naturally occurring hydrophilic colloids and gums such as gelatin, albumin, guar, xantham, acacia, chitosan, starches and their derivatives, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate and in various combinations within a layer.

A porous structure may be introduced into ink receiving or recording layers comprised of hydrophilic polymers by the addition of ceramic or hard polymeric particulates, by foaming or blowing during coating, or by inducing phase separation in the layer through introduction of nonsolvent. In general, it is preferred for the base layer to be hydrophilic, but not porous. This is especially true for photographic quality prints, in which porosity may cause a loss in gloss. In particular, the ink receiving or recording layer may consist of any hydrophilic polymer or combination of polymers with or without additives as is well known in the art.

If desired, the ink receiving or recording layer can be overcoated with an ink permeable, anti-tack protective layer such as, for example, a layer comprising a cellulose derivative or a cationically modified cellulose derivative or mixtures thereof. An especially preferred overcoat is poly β-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water based inks. The overcoat layer can also protect the ink receiving or recording layer from abrasion, smudging, and water damage. In general, this overcoat layer may be present at a dry thickness of about 0.1 to about 5 µm, preferably about 0.25 to about 3 µm.

In practice, various additives may be employed in the ink receiving or recording layer and overcoat. These additives include surface active agents such as surfactant(s) to improve coatability and to adjust the surface tension of the dried coating, acid or base to control the pH, antistatic agents, suspending agents, antioxidants, hardening agents to crosslink the coating, antioxidants, UV stabilizers, and light stabilizers. In addition, a mordant may be added in small quantities (2%-10% by weight of the base layer) to improve waterfastness. Useful mordants are disclosed in U.S. Pat. No. 5,474,843.

The layers described above, including the ink receiving or recording layer and the overcoat layer, may be coated by conventional coating means onto a transparent or opaque support material commonly used in this art. Coating methods may include, but are not limited to, blade coating, wound wire rod coating, slot coating, slide hopper coating, gravure, and curtain coating. Some of these methods allow for simultaneous coatings of both layers, which is preferred from a manufacturing economic perspective.

The IRL (ink or dye receiving layer) may be coated over a tie layer (TL). There are many known formulations, which may be useful as ink or dye receiving or recording layers. The primary requirement is that the IRL is compatible with the inks which it will be imaged so as to yield the desirable color gamut and density. As the ink drops pass through the IRL, the ink or dyes are retained or mordanted in the IRL, while the ink solvents pass freely through the IRL and are rapidly absorbed by the TL. Additionally, the IRL formulation is preferably coated from water, exhibits adequate adhesion to the TL, and allows for easy control of the surface gloss.

For example, Misuda et al in U.S. Pat. Nos. 4,879,166; 5,264,275; 5,104,730; 4,879,166; and Japanese Patents 1,095,091; 2,276,671; 2,276,670; 4,267,180; 5,024,335; and 5,016,517 disclose aqueous based IRL formulations comprising mixtures of psuedo-bohemite and certain water soluble resins. Light in U.S. Pat. Nos. 4,903,040; 4,930,041; 5,084,338; 5,126,194; 5,126,195; and 5,147,717 discloses aqueous-based IRL formulations comprising mixtures of vinyl pyrrolidone polymers and certain water dispersible and/or water soluble polyesters, along with other polymers and addenda. Butters et al in U.S. Pat. Nos. 4,857,386 and 5,102,717 disclose ink absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous coatable IRL formulations based on poly(vinyl alcohol). Iqbal in U.S. Pat. No. 5,208,092 discloses water-based IRL formulations comprising vinyl copolymers, which are subsequently crosslinked. In addition to these examples, there may be other known or contemplated IRL formulations, which are consistent with the aforementioned primary and secondary requirements of the IRL, all of which fall under the spirit and scope of the current invention.

The IRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, and light stabilizers.

It may also be desirable to overcoat the IRL for the purpose of enhancing the durability of the imaged element. Such overcoats may be applied to the IRL either before or after the element is imaged. For example, the IRL can be overcoated with an ink permeable layer through which inks freely pass. Layers of this type are described in U.S. Pat. Nos. 4,686,118; 5,027,131; and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, that is, continuous, piezoelectric, or thermal. Therefore, depending on the specific ink process, the inks may contain widely differing amounts and combinations of solvents, colorants, preservatives, surfactants, and humectants. Inks preferred for use in combination with the image recording elements of the present invention are water-based. However, it is intended that alternative embodiments of the image recording elements as described above, which may be formulated for use with inks which are specific to a given ink recording process or to a given commercial vendor, fall within the scope of the present invention.

The thermal ink or dye image receiving or recording layer of the receiving or recording elements may comprise, for example, a polycarbonate, a polyurethane, a polyester, polyvinyl chloride, poly(styrene-co-acrylonitrile), poly(caprolactone), or mixtures thereof. The ink or dye image receiving or recording layer may be present in any amount that is effective for the intended purpose. An overcoat layer may be further coated over the ink or dye receiving or recording layer, such as described in U.S. Pat. No. 4,775,657 of Harrison et al.

The material of the invention can be incorporated in any ink or dye donor elements that are used with the ink or dye receiving or recording element. These donor elements conventionally comprise a support having thereon an ink or dye containing layer. Any ink or dye can be used in the ink or dye donor employed in the invention, provided it is transferable to the ink or dye receiving or recording layer by the action of heat. Ink or dye donors applicable for use in the present invention are described, for example, in U.S. Pat. Nos. 4,916,112; 4,927,803; and 5,023,228. As noted above, ink or dye donor elements are used to form an ink or dye transfer image. Such a process comprises image-wise heating an ink or dye donor element and transferring an ink or dye image to an ink or dye receiving or recording element as described above to form the ink or dye transfer image. The thermal ink or dye transfer method of printing, an ink or dye donor element may be employed which comprises a poly(ethylene terephthalate) support coated with sequential repeating areas of cyan, magenta, and yellow ink or dye, and the ink or dye transfer steps are sequentially performed for each color to obtain a three color ink or dye transfer image. When the process is only performed for a single color, then a monochrome ink or dye transfer image is obtained.

Thermal printing heads which can be used to transfer ink or dye from ink or dye donor elements to receiving or recording elements of the invention are available commercially. There can be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal ink or dye transfer may be used, such as lasers as described in, for example, GB No. 2,083,726A.

A thermal ink or dye transfer assemblage may comprise (a) an ink or dye donor element, and (b) an ink or dye receiving or recording element as described above, the ink or dye receiving or recording element being in a superposed relationship with the ink or dye donor element so that the ink or dye layer of the donor element is in contact with the ink or dye image receiving or recording layer of the receiving or recording element.

When a three color image is to be obtained, the above assemblage is formed on three occasions during the time when heat is applied by the thermal printing head. After the first dye is transferred, the elements are peeled apart. A second dye donor element (or another area of the donor element with a different dye area) is then brought in register with the dye receiving or recording element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps. The use of liquid toners in place of dry toners is simply one of those variations.

The first basic step, creation of an electrostatic image, can be accomplished by a variety of methods. In one form, the electrophotographic process of copiers uses imagewise photodischarge, through analog or digital exposure, of a uniformly charged photoconductor. The photoconductor may be a single use system, or it may be rechargeable and reimageable, like those based on selenium or organic photoreceptors.

In an alternate electrographic process, electrostatic images are created ionographically. The latent image is created on dielectric (charge holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to paper (or other substrate). The paper is charged electrostatically, with the polarity chosen to cause the toner particles to transfer to the paper. Finally, the toned image is fixed to the paper. For self-fixing toners, residual liquid is removed from the paper by air drying or heating. Upon evaporation of the solvent, these toners form a film bonded to the paper. For heat-fusible toners, thermoplastic polymers are used as part of the particle. Heating both removes residual liquid and fixes the toner to paper.

In another embodiment, in order to produce photographic elements, the composite support sheet is coated with a photographic element or elements. The photographic elements can be single color elements or multicolor elements. Multicolor elements contain image ink or dye forming units sensitive to each of the three primary regions of the spectrum. Each unit can comprise a single emulsion layer or multiple emulsion layers sensitive to a given region of the spectrum. The layers of the element, including the layers of the image forming units, can be arranged in various orders as known in the art. In an alternative format, the emulsions sensitive to each of the three primary regions of the spectrum can be disposed as a single segmented layer.

The photographic elements useful in the present invention can be any known photographic elements such as black and white elements, single color elements or multicolor elements. Conventionally multicolor elements contain dye image forming units sensitive to each of the three primary regions of the spectrum. Each unit can be comprised of a single emulsion layer or of multiple emulsion layers sensitive to a given region of the spectrum. The layers of the element, including the layers of the image forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur containing compounds, for example, allyl isothiocyanate, sodium thiosulfate and allyl thiourea, reducing agents, for example, polyamines and stannous salts, noble metal compounds, for example, gold, platinum, and polymeric agents, for example, polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. By predominantly silver chloride, it is meant that the grains of the emulsion are greater than about 50 mole percent silver chloride. Preferably, they are greater than about 90 mole percent silver chloride, and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular or core/shell grains. Grains having a tabular or cubic morphology are preferred.

The photographic elements may utilize emulsions as described in The Theory of the Photographic Process, Fourth Edition, T. H. James, Macmillan Publishing Company, Inc., 1977, pages 151-152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals that reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives, tin compounds, polyamine compounds, and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8-11) and low pAg (pAg 1-7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 Al (Takada), EP 0 404 142 Al (Yamada), and EP 0 435 355 Al (Makino).

The photographic elements may use emulsions doped with Group VII metals such as iridium, rhodium, osmium, and iron as described in *Research Disclosure*, September 1994, Item 36544, Section 1, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201-203.

A typical multicolor photographic element comprises a support bearing a cyan ink or dye image forming unit comprising at least one red sensitive silver halide emulsion layer having associated therewith at least one cyan dye forming coupler, a magenta image forming unit comprising at least one green sensitive silver halide emulsion layer having associated therewith at least one magenta dye forming coupler, and a yellow dye image forming unit comprising at least one blue sensitive silver halide emulsion layer having associated therewith at least one yellow dye forming coupler. The element may contain additional layers, such as filter layers, interlayers, overcoat layers, and subbing layers. All of these can be coated on a support that can be transparent or reflective (for example, a paper support). The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. The invention may be utilized with the materials disclosed in Research Disclosure, September 1997, Item 40145. The invention is particularly suitable for use with the material color paper examples of sections XVI and XVII. The couplers of section II are also particularly suitable. The Magenta I couplers of section II, particularly M-7, M-10, M-18, and M-18, set forth below are particularly desirable. In the following Table, reference will be made to (1) *Research Disclosure*, December 1978, Item 17643, (2) *Research Disclosure*, December 1989, Item 308119, and (3) *Research Disclosure*, September 1994, Item 36544, all published by Kenneth Mason Publications, Ltd., Dudley Annex, 12a North Street, Emsworth, Hampshire PO10 7DQ, ENGLAND. Table 3 and the references cited in Table 3 are to be read as describing particular components suitable for use in the elements of the invention. The Table and its cited references also describe suitable ways of preparing, exposing, processing and manipulating the elements and the images contained therein.

TABLE 3

| Reference Section | Subject Matter |
| --- | --- |
| 1 I, II | Grain composition, |
| 2 I, II, IX, X, XI, XII, XIV, XV | morphology and preparation. Emulsion preparation including |
| I, II, III, IX | hardeners, coating aids, |
| 3 | A & B addenda, etc. |
| 1 III, IV | Chemical sensitization and |
| 2 III, IV | spectral sensitization |
| 3 IV, V | Desensitization. |
| 1 V | UV dyes, optical brighteners, |
| 2 V | luminescent dyes |
| 3 VI | |
| 1 VI | Antifoggants and stabilizers |
| 2 VI | |
| 3 VII | |
| 1 VIII | Absorbing and scattering |
| 2 VIII, XIII, XVI | materials; Antistatic layers; |
| 3 VIII, IX | C & D matting agents |
| 1 VII | Image-couplers and image- |
| 2 VII | modifying couplers; Dye |
| 3 X | stabilizers and hue modifiers |
| 1 XVII | Supports |
| 2 XVII | |
| 3 XV | |
| 3 XI | Specific layer arrangements |
| 3 XII, XIII | Negative working emulsions; Direct positive emulsions |
| 2 XVIII | Exposure |
| 3 XVI | |
| I XIX, XX | Chemical processing; |
| 2 XIX, XX, XXII | Developing agents |
| 3 XVIII, XIX, XX | |
| 3 XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4.™. (Eastman Kodak Company) Process or other processing systems suitable for developing high chloride emulsions. This invention is also directed towards a photographic recording element comprising a support and at least one light sensitive silver halide emulsion layer comprising silver halide grains as described above.

Photographic elements utilizing the composition of the invention can be processed in any of a number of well known photographic processes utilizing any of a number of well known processing compositions, described, for example, in T. H. James, editor, *The Theory of the Photographic Process*, 4th Edition, Macmillan, N.Y., 1977. In the case of processing a negative working element, the element is treated with a color developer (that is one which will form the colored image dyes with the color couplers), and then with a oxidizer and a solvent to remove silver and silver halide. In the case of processing a reversal color element, the element is first treated with a black and white developer (that is, a developer which does not form colored dyes with the coupler compounds) followed by a treatment to fog silver halide (usually chemical fogging or light fogging), followed by treatment with a color developer. Preferred color developing agents are p-phenylenediamines. Development is followed by bleach fixing, to remove silver or silver halide, washing and drying.

The method of the present invention comprises providing layered material, splaying said layered material with an azinium compound, preferably soluble or dispersible in water.

In a preferred embodiment, the layered materials may be initially dispersed in a suitable solvent, preferably water or water-based. A suitable azinium compound is incorporated into this dispersion either as a solid or as a solution or dispersion. As per the invention, the layered materials are sufficiently splayed by the azinium compound. Such a dispersion may be incorporated in a matrix polymer, with the layered materials dispersed in a splayed state in the resultant nanocomposite. In another preferred embodiment, the layered materials may simultaneously be combined with the azinium compound with or without an additional matrix polymer. In another preferred embodiment, the layered materials, the azinium compound and a polymerizer may be dispersed in suitable solvent, preferably aqueous; the aforesaid polymerizer is subsequently polymerized by step or chain polymerization to form the desired nanocomposite.

In still another preferred embodiment, the layered material may be splayed by more than one azinium compound and may be further dispersed in more than one polymerizer, to ultimately form the desired nanocomposite. In another preferred embodiment, the layered materials splayed by the N-azinium compound may be melt blended with other components with or without shear. In another preferred embodiment, the layered materials, and the N-azinium compound may be melt blended with any other components with or without shear. In another preferred embodiment, the layered materials and the other components may be combined in a solvent phase to achieve intercalation/exfoliation followed by mixing with a matrix. The resultant solution or dispersion may be used as is or with solvent removal through drying. The solvent may be aqueous or organic. The organic solvent may be polar or nonpolar. In yet another preferred embodiment, the layered materials, the N-oxyazinium, and the matrix may be combined in a solvent phase to achieve intercalation/exfoliation.

The article of the instant invention comprising the layered materials and the azinium compound, together with any optional addenda, can be formed by any suitable method such as, extrusion, coextrusion, with or without orientation by uniaxial or biaxial, simultaneous or consecutive, stretching, blow molding, injection molding, lamination, coating or solvent casting.

In one preferred embodiment, the imaging support utilizing the composition of the invention comprising a matrix polymer and the splayed layered materials of the invention may be formed by extrusion and/or coextrusion, followed by orientation, as in typical polyester based photographic film base formation. Alternatively, a composition comprising a matrix polymer and the splayed layered materials of the invention can be extrusion coated onto another support, as in typical resin coating operation for photographic paper. In another embodiment, a composition comprising a matrix polymer and the splayed layered materials of the invention can be extruded or coextruded and preferably oriented into a preformed sheet and subsequently laminated to another support, as in the formation of typical laminated reflective print media.

The layers described above may be coated by conventional coating means onto a support material commonly used in this art. Coating methods may include, but are not limited to, wound wire rod coating, knife coating, slot coating, slide hopper coating, gravure coating, spin coating, dip coating, skim-pan-air-knife coating, multilayer slide bead, doctor blade coating, gravure coating, reverse roll coating, curtain coating, and multilayer curtain coating. Some of these methods allow for simultaneous coatings of more than one layer, which is preferred from a manufacturing economic perspective if more than one layer or type of layer needs to be applied. Known coating and drying methods are described in further detail in *Research Disclosure* No. 308119, published December 1989, pages 1007-1008. Slide coating is preferred, in which several layers may be simultaneously applied. The support may be stationary, or may be moving so that the coated layer is immediately drawn into drying chambers. After coating, the layers are generally dried by simple evaporation, which may be accelerated by known techniques such as convection heating.

The coating composition may be applied to one or both substrate surfaces through conventional pre-metered or post-metered coating methods listed above. The choice of coating process would be determined from the economics of the operation and, in turn, would determine the formulation specifications such as coating solids, coating viscosity, and coating speed. After coating, the ink recording element may be subject to calendering or supercalendering to enhance surface smoothness. In a preferred embodiment of the invention, the inkjet recording element is subject to hot soft-nip calendering at a temperature of about 65° C. and a pressure of 14000 kg/m at a speed of from about 0.15 m/s to about 0.3 m/s.

The following examples are provided to illustrate the invention.

EXAMPLES

The layered material used in the following examples include smectite clay, which is either a natural montmorillonite, or a synthetic bentonite. The natural clay commercially known as "Cloisite Na" and the synthetic clay commercially known as "Laponite RDS" are supplied by Southern Clay Products.

The chemical structure of the various azinium compounds used in these examples are provided in Table A.

Sample Preparation

Aqueous sols of the smectite clay at varying solid content were mixed in different proportions with aqueous solutions of the azinium compounds at varying solid content. The mixtures were stirred for 24 hours, and subsequently coated on glass slides, dried and analyzed by X-ray diffraction (XRD) technique. XRD measurement revealed the (001) basal plane spacing of the smectite clay in the films. An increase in the basal plane spacing of the smectite clay in the films, as compared to the neat clay, is indicative of splaying of the clay lattice by the azinium compounds.

In Table A the details of the compositions of the clay azinium mixtures and the corresponding XRD data are provided. It is clear that the basal plane spacing of the smectite clay increased in presence of the azinium compounds, demonstrating that the azinium compounds are effective splayant for layered materials.

TABLE A

| Sample # | Type of Clay | Wt % Clay | Wt % Azinium | Ratio Azinium:Clay | Str. Of Azinium | (001) spacing of clay in film | (001) spacing of neat clay |
|---|---|---|---|---|---|---|---|
| A | Laponite-RDS | 4% | 2% | 33:66 | Ph-(4-pyridinium)-N+-(CH$_2$)$_3$-SO$_3^-$ | 20.6 | 13.6 |
| B | Laponite-RDS | 4% | 1% | 20:80 | Ph-(4-pyridinium)-N+-(CH$_2$)$_3$-SO$_3^-$ | 15.5 | 13.6 |
| C | Laponite-RDS | 4% | 1% | 20:80 | 2,3,3-trimethyl-3H-indolium-N+-(CH$_2$)$_3$-SO$_3^-$ | 16.5 | 13.6 |
| D | Laponite-RDS | 4% | 1% | 20:80 | Ph-(4-pyridinium)-N+-(CH$_2$)$_3$-O-C(=O)-Ph, Br$^-$ | 15.5 | 13.6 |
| E | Laponite-RDS | 2% | 2% | 50:50 | Ph-(4-pyridinium)-N+-(CH$_2$)$_3$-SO$_3^-$ | 20.6 | 13.6 |
| F | Laponite-RDS | 2% | 1% | 33:67 | Ph-(4-pyridinium)-N+-(CH$_2$)$_3$-SO$_3^-$ | 20.6 | 13.6 |
| G | Laponite-RDS | 2% | 2% | 50:50 | Ph-(4-pyridinium)-N+(-O-(CH$_2$)$_3$-SO$_3^-$) | 20.6 | 13.6 |
| H | Laponite-RDS | 2% | 1% | 33:67 | Ph-(4-pyridinium)-N+(-O-(CH$_2$)$_3$-SO$_3^-$) | 20.6 | 13.6 |

TABLE A-continued

| Sample # | Type of Clay | Wt % Clay | Wt % Azinium | Ratio Azinium:Clay | Str. Of Azinium | (001) spacing of clay in film | (001) spacing of neat clay |
|---|---|---|---|---|---|---|---|
| I | Cloisite | 0.50% | 0.50% | 50:50 | 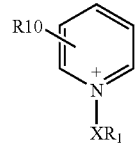 | 15 | 12.9 |
| J | Cloisite | 0.50% | 0.25% | 33:67 | 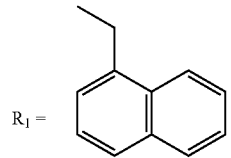 | 15.0 & 12.9 | 12.9 |

The invention has been described in detail with particular reference to certain preferred embodiments thereof, but it will be understood that variations and modifications can be effected within the spirit and scope of the invention.

The invention claimed is:

1. A splayant comprising an azinium compound capable of splaying a layered material and represented by the following formula I:

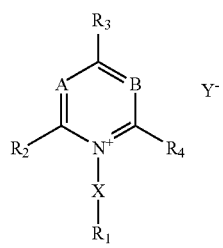

wherein A and B independently represent a carbon, C—$R_5$, C—$R_6$ or nitrogen;

X is independently O, N, S, C=O, C=S, O—C=O;

Each of $R_2$, $R_3$, $R_4$, $R_5$, $R_6$, is independently hydrogen, alkyl or an aryl group; $R_1$ is an alkyl or aryl group; and Y is a charge balancing anion, wherein Y is part of said A, B, or R groups.

2. The splayant of claim 1 wherein said A, B and R groups are able to join to form a ring.

3. The splayant of claim 1 wherein said azinium compound is represented by the following formulas III and IV:

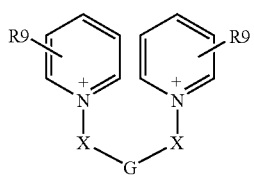

IV wherein $R_1$ is an alkyl, or an aryl group;

$R_{10}$ or $R_9$ are independently a hydrogen atom, alkyl, aryl, heterocyclic, carboxylic, carboxylate, carbonamido, sulfonamido, nitryl, groups, —CO—$R_{11}$ wherein $R_{11}$ is an alkyl group or aryl group, or —(CH=CH)$_m$—$R_{12}$ group wherein $R_{12}$ is an aryl or heterocyclic group and m is 1 or 2;

G is an alkylene group; and

X is independently O, N, S, C=O, C=S, O—C=O.

4. The splayant of claim 3 wherein X is O.

5. The splayant of claim 3 wherein $R_9$, $R_{10}$, $R_1$ and G are:

| $R_{10}$ or $R_9$ | $R_1$ or G |
|---|---|
| $R_{10}$ = 4-Ph | $R_1$ = Me |
| $R_{10}$ = 4-Ph | $R_1$ = (CH$_2$)$_3$—Ph |
| $R_{10}$ = 4-Ph | R1 = (CH$_2$)$_3$—SO$_3^-$ |
| $R_{10}$ = 4-Ph | $R_1$ = 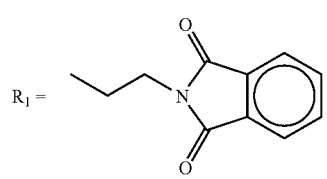 |
| $R_{10}$ = 4-Ph | $R_1$ = |
| $R_{10}$ = 4-CN | $R_1$ = Me |
| $R_{10}$ = 3-CO$_2$Me | $R_1$ = Me |
| $R_{10}$ = 3-CO2—(CH$_2$)$_2$—Ph | $R_1$ = Me |
| $R_9$ = 4-Ph | G = (CH$_2$)$_3$ |
| $R_9$ = 4-Ph | G = (CH$_2$)$_4$ |
| $R_9$ = 4-Ph | G = (CH$_2$)$_5$ |
| $R_{10}$ = 3-Ph | $R_1$ = Me |

-continued

| $R_{10}$ or $R_9$ | $R_1$ or G |
|---|---|
| $R_{10}$ = 3,4-benzo | $R_1$ = Me |
| $R_9$ = 3,4-benzo | G = $(CH_2)_3$ |
| $R_{10}$ = H | $R_1$ = $(CH_2)_3$—$SO_3^-$ |
| $R_{10}$ = H | $R_1$ = 4-nitrophenyl |
| $R_9$ = H | G = $(CH_2)_2$ |
| $R_9$ = H | G = $(CH_2)_3$ |
| $R_{10}$ = 2-Me | $R_1$ = Me |
| $R_{10}$ = 2-Me | $R_1$ = $(CH_2)_3$—$SO_3^-$ |

-continued

| $R_{10}$ or $R_9$ | $R_1$ or G |
|---|---|
| $R_{10}$ = 4-Me | $R_1$ = Me |
| $R_9$ = 4-Me | G = $(CH_2)_4$ |
| $R_{10}$ = 4-$CO_2^-$ | $R_1$ = Me |
| $R_{10}$ = 4-$CON(CH_2CH_2OH)_2$ | $R_1$ = $(CH_2)_3$—$SO_3^-$. |

\* \* \* \* \*